Figure 1:
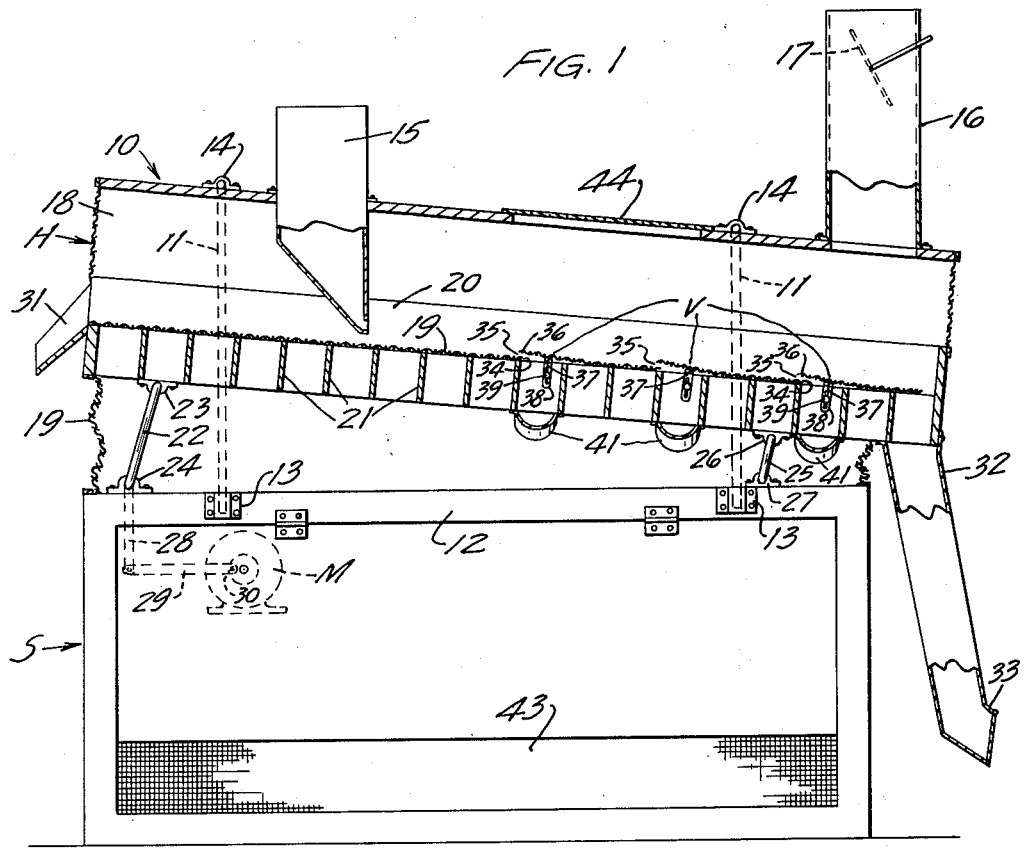

Sept. 25, 1956     A. R. FORSBERG     2,764,293

HIGH SPEED VACUUM SEPARATOR

Filed Dec. 3, 1952

INVENTOR
ARTHUR R. FORSBERG
BY Williamson, Williamson, Schroeder & Adams
ATTORNEYS

United States Patent Office 2,764,293
Patented Sept. 25, 1956

2,764,293

HIGH SPEED VACUUM SEPARATOR

Arthur R. Forsberg, Thief River Falls, Minn.

Application December 3, 1952, Serial No. 323,911

3 Claims. (Cl. 209—467)

This invention relates to a high speed vacuum separator and more particularly to a multistage apparatus and method for efficiently separating and classifying uncleaned seeds.

It is a general object of the invention to provide for an efficient apparatus which will rapidly and completely separate seeds into several fractions which will be controlled as to size and purity.

Another object of the invention is to provide for a vacuum separator in which air is drawn through a series of steps in an oscillating screen, the stream of air being maintained through all screen surface to continuously remove dust and chaff from the seeds while at the same time assisting in jumping or vibrating the seed layer on each portion of the screen so that the lighter unfinished seed product will rise to the top and be passed on to the next portion of screen surface while the lower pure and heavy seeds will be passed into a product discharge, the cycle being repeated several times.

Another object of the invention is to provide for an apparatus of the class described in which each of the stepped inclined screen portions is adjustable with respect to the preceding screen area to effect control of the separate fractions of seeds produced by the apparatus.

A further object is to provide for a very rapid and efficient method of separating dust, chaff and stones from a crude seed product which divides the product into a layer comprising pure sized seed portion and an undersized seed portion containing culls, weeds and hulls suitable for consecutive separation by further stages, each producing another pure seed product of smaller size and provision being made for maintaining the seed layer of each stage at a proper thickness for further separation.

A still further object of this invention is to provide for a method of separating and cleaning seeds which includes combining an oscillating action to seeds fed onto the surface of a series of stepped inclined areas while at the same time causing air to be pulled through the screen, the action of the air at its point of separation with the seeds cooperating with the bouncing action of the screen at its discharge to quickly urge the lighter dust free products to the top of the seed layer and to pass beyond a separating vane to another similar screen while the pure heavier seed product passes below the vane, the process being repeated and the lower portion of the seed layer on each screen being discharged separately through passageways for collection.

Figure 2:
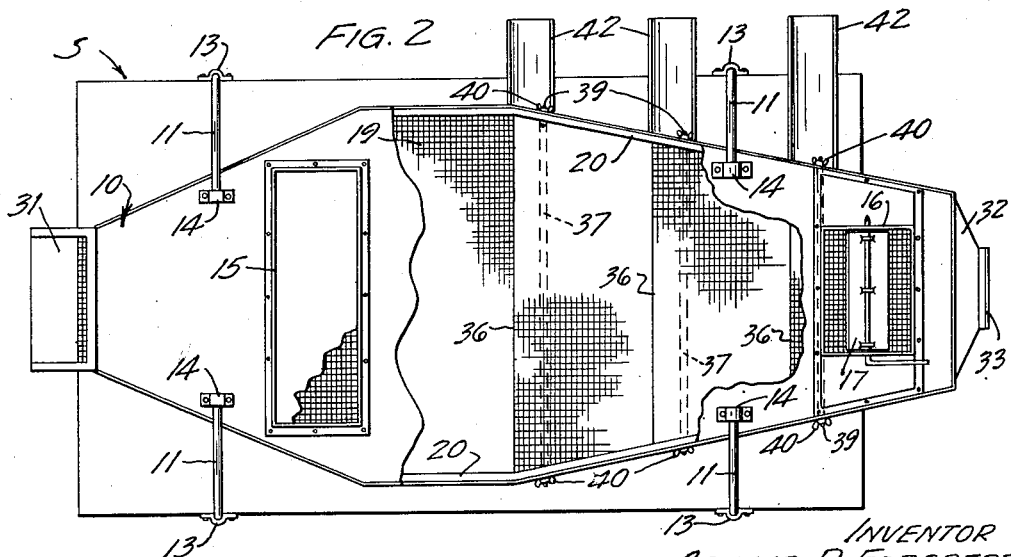

These and other objects and advantages of my invention will more fully appear from the following description made in connection with the accompanying drawings wherein like reference characters refer to similar parts throughout the several views and in which:

Fig. 1 is a side elevation of my vacuum separator with certain portions thereof in vertical section to better show the internal construction; and Fig. 2 is a top plan view of the separator with a portion of the housing cut away to show the underlying multistage perforate plane or screen structure.

Referring now more particularly to the drawing, my vacuum separator comprises a supporting structure S, the upper portion of which consists of a rigid top 10. The top 10 may be secured at the upper portion of structure S by means of rigid standards 11 which are secured to the base 12 of supporting structure S by clamp members 13 and to the top 10 by clamp members 14. The top 10 of the supporting structure S has disposed therethrough a feed inlet or hopper 15 and an air outlet 16 adjacent one end thereof. The outlet 16 may comprise a conduit having a damper mechanism 17 for varying the evacuation of air by a connecting air fan or pump (not shown). Supported from the top 10 and constituting a housing H is an upper bellows 18 constructed of flexible material. The lower portion of the housing may comprise an extension of bellows 18 or a separate bellows 19 as illustrated. Intermediate the base 11 and the top 10 of the housing H is a perforate seed receiving member such as screen 19. The perforate seed receiving member or screen 19 may have a rigid outer frame 20 which, together with ribs 21, maintain it securely in position. The screen lies in a general plane which is inclined downwardly toward one end thereof. The screen 19, frame 20 and ribs 21 are supported by a link 22 pivotally secured at its upper end to the frame at 23 and at its lower end 24 to the base 11. Another shorter link 25 is pivotally interposed between the pivot mount 26 attached to frame 20 and to the pivot mount 27 secured to base 11. Pivot link 22 may have a rigid extension 28 the lower end of which is subject to oscillating motion such as may be caused by pivotal crank connection through link 29 to a crank pin 30 rotating in response to a force such as produced by motor M.

Another opening in the housing is positioned at one side thereof to constitute a discharge 31 for rocks and dense material proceeding over the upper edge of screen 19. The lower end of frame 20 bears a discharge conduit 32 for the final light weight waste fraction, including hulls, undersized seeds and culls. The discharge conduit 32 terminates in a spout 33.

A multistage separating means V is disposed transversely of the perforate plane or screen 19 and constitutes a discontinuous stepped separating structure, each forming a straight line across the direction of travel of seeds on the screen 19 and each lying in spaced parallel relation with the other. In the simplified form shown, each of the steps in my multistage separating means V may constitute a slit or break in the screen 19 extending completely across from one side of the frame 20 to the other. The slit or break 34 in each of the stages is preferably formed so as to coincide with one of the ribs 21 as shown in Fig. 1. The discontinuity of break 34 creates a trailing edge 35 and a leading edge 36 just beyond the break. The leading edge 36 is bent upwardly so as to be spaced evenly from the plane of the screen 19. The leading edge 36 thus constitutes an interruption in each of the stages but does not necessarily destroy the general plane of the screen or perforate plane 19. A rod 37 is fixed to the underside of the screen 19 beneath and slightly advanced from the leading edge 36. This rod will tend to reinforce and maintain the leading edge 36 in straight alignment with respect to the plane of screen 19. At each end of each of the rods 37 and adjacent the inside walls of frame 20 are depending brackets 38 which may form adjusting means for widening or narrowing the discontinuity or gap 34 at each step of the multistage separating structure V. The bracket 38 may be slotted longitudinally for receiving the head of a bolt 39, the outer threaded end of which can extend to the outside of frame 20 where it is secured by such means as wing nut 40 for retaining each leading edge 36 in its adjusted position. A trough 41 may be secured between the two adjacent ribs 21 which define a passageway immediately beneath each stepped stage. Each trough 41 may extend through an opening in the housing H and terminate in a spot 42 at the outside of the apparatus as shown in Fig. 2.

An important feature of my invention is the converging formation at the forward extension of the framework 20 which retains the screen 19. This feature will be explained in detail under the explanation of the operation of the device. In the supporting structure S at the lower or base portion thereof, a cloth or screen covered air inlet 43 may be supplied so as to allow the air evacuated from discharge 16 to enter into the housing H. Certain small and heavy particles such as sand will pass through the screen and be collected at the bottom of the structure S at the inside thereof and may be periodically removed therefrom. For visually observing the activity within the housing H a window 44 may be formed at the top 10 of the supporting structure. I prefer to have such window reinforced as by wire screen in the event the glass should be ruptured.

Operation

In the operation and use of my vacuum separator leading edge 36 at each discontinuous step of the multistage separating means V is adjusted to the desired height and the wing nuts 40 then are tightened to maintain the space or gap desired. Vacuum is then applied to the discharge outlet 16 and the damper mechanism 17 may likewise be adjusted to the desired position. Blower means for creating the suction in the outlet 16 is not shown. The motor M is then energized to cause the links 22 and 25 to rapidly oscillate back and forth and thereby vibrate and shake the frame 20 together with its screen 19. It will be noted that the pivotal points 23 and 24 of the link 22 are farther apart than the pivotal points 26 and 27. This selection of dimension will result in a movement such as will cause stones and heavy particles to move upwardly upon the screen 19 and be discharged from the spout 31 while the remainder of the initial seed product coming through the inlet 15 will progress downwardly upon the inclined screen 19 in a manner well known to the art. Now, however, as the seed product progresses to the first stage of the separating means, the individual seeds and particles will have distributed themselves into stratified layers because of the vibration and shaking of the screen 19. The larger and heavier seed particles will form the bottom strata while the lighter particles, including undersized seeds, hulls and broken seed particles, will form at the upper strata. Vibration alone can accomplish to some degree the stratification as above noted. When, however, this vibration is coupled with an upsweep of air through the screen, the separation will be more quickly effected and will be more complete because of the exaggerated vibrating and bouncing imparted to the smaller particles by the upsweep of air. Also, as a simultaneous effect, is the cleaning and blowing out of chaff, dust and other particles which are sufficiently light to be airborne during operation of the device. Since the air evacuated through the discharge conduit or outlet 16 is pulled through the screen 19 throughout its entire surface the removal of light particles such as chaff and dust will be effected at all points regardless of the stage of separation. Now as the depth of vibrating seeds approaches the trailing edge 35 of the screen 19, the purified lower layer will pass through the gap or break 34 and drop into the first trough 41. The impure layer, being positioned above the leading edge 36 of the first stage, will merely pass on and be accumulated beyond the first stage while still remaining upon the surface of another area of screen 19. Since the volume of seeds has been reduced by the amount which has progressed under the leading edge 36 in the first of the multistage separating means it is desirable to provide for regaining the depth so that the separating process can be repeated. The converging side walls of the frame 20 cause the successive areas at each stage to become less, thus compensating for the volume of seeds. The approximate depth of the seeds is thus maintained throughout the separation process. As this new depth of vibrating and bouncing seeds approaches the second leading edge 36, the same stratification occurs as previously mentioned. In this case, however, there are more small seeds and particles in the top layer and the product collected at the gap or space 34 in the second trough 42 will not be of the same high quality as that collected by the first trough. It does, however, represent the purest portion of the seed depth which was presented to the leading edge 36 at the second stage. The impure fraction passing over the leading edge will again be condensed so as to regain substantially its original depth and the separation process is again repeated in the multistage operation. It is understood, of course, that the process may be repeated as often as desired. The final light-weight product will be substantially entirely waste and will pass out through the discharge 32 and be collected as waste.

It may thus be seen that I have devised an apparatus and method for separating, cleaning and classifying seed material which because of the novel structure and the exaggerated bouncing effect of the seeds while being agitated on a vibrating screen, will be treated very rapidly and completely to form several sealable fractions of seed product varying in quality to a controlled specification.

It will, of course, be understood that various changes may be made in the form, details, arrangement and proportions of the parts without departing from the scope of my invention.

What I claim is:

1. In a vacuum separator for seeds and the like the combination of a supporting structure defining a housing with an oscillable frame intermediate the top and bottom of said housing, a perforate seed supporting member having a receiving portion and a discharge portion mounted upon the frame and oscillable therewith to cause a uniform depth of seeds to travel therealong toward said discharge portion, oscillating means mounted on said supporting structure and connected with said frame and being constructed and arranged to produce relatively more vigorous and pronounced oscillation of the discharge portion of said seed supporting member than of the receiving portion thereof, an inlet for seeds to be separated mounted on said supporting structure and overlying the receiving portion of said seed supporting member at a position intermediate its ends, an air discharge conduit connected to said housing for evacuating air in confined flow through said perforate seed supporting member, and a plurality of stepped breaks disposed transversely of said seed supporting member and in spaced relation one with the other, said stepped breaks each dividing the depth of seeds approaching it into a lower separated and more pure layer of seeds with the upper less pure layer passing over and forming a depth of seeds for separation by the next step in a similar manner, said frame with its supported seed supporting member converging at its forward extension to compensate for seeds extracted from each succeeding separating step thus maintaining substantially the original depth of seeds.

2. A vacuum separator for seeds and the like comprising a supporting structure which includes a housing defining a generally enclosed space, a perforate and substantially plane seed receiving member traversing the space within said housing, an air inlet in the lower portion of said housing underlying said seed receiving member, an air outlet at the upper portion of the housing overlying the seed receiving member, a discharge opening at one side of the housing and communicating with the upper surface of the seed receiving member for removal of stone and other dense impurities, discontinuously stepped separating means disposed transversely along said seed receiving member and including a strata separating edge extending in a direction opposite to the direction of said movement and disposed above said seed receiving member to define separated seed flow thereabove and therebelow, segregated discharge means communicating with the separating means of said seed receiving member, a feed opening through an upper portion of the housing overlying the seed receiving member and intermediate the stone discharge opening and the stepped separating means, and a drive assembly mounted on the supporting structure for imparting oscillatory motion to said seed receiving member whereby seeds and the like which are already free of stones and other dense particles will be further separated into a pure classified product and a partially purified lighter product.

3. In a vacuum separator for seeds and the like the combination of a supporting structure defining a housing with an oscillable frame intermediate the top and bottom of said housing, a perforate seed receiving member mounted upon the frame and oscillable therewith to cause a uniform depth of seeds to be distributed for the width thereof, a discharge opening in said housing positioned to communicate with the upper surface of said seed receiving member at a position ahead of the inlet with respect to the direction of travel of said seed, said discharge being adapted to remove and deliver stones and other dense impurities from the reverse flow thereof on said seed receiving member, an inlet for seeds to be separated mounted on said supporting structure and overlying the receiving member at a position intermediate its ends, an air discharge conduit connected to said housing for evacuating air in confined close flow between an upper portion of the housing and said perforate seed receiving member, a plurality of spaced transverse vanes for directing and distributing the upward flow of air in response to air suction created by said air discharge conduit, and a plurality of stepped breaks disposed transversely of said seed receiving member and in spaced relation one with the other, said stepped breaks each dividing the depth of seeds approaching it into a lower separated and more pure layer of seeds with the upper less pure layer lying in constant agitation by virtue of the oscillation of said frame and under the influence of evacuating air so as to cause the upper layer to pass over and form a depth of seeds for separation of the next step in a similar manner, said frame with its supported seed receiving member converging at its forward extension to compensate for seeds extracted from each succeeding separating step thus tending to maintain a substantially equal concentration of seeds at each stage of the separation.

References Cited in the file of this patent

UNITED STATES PATENTS

| | | |
|---|---|---|
| 106,048 | George | Aug. 2, 1870 |
| 1,068,162 | Payne | July 22, 1913 |
| 1,128,850 | Clifford | Feb. 16, 1915 |
| 1,252,273 | Lever | Jan. 1, 1918 |
| 2,040,196 | Berrisford | May 12, 1936 |
| 2,102,880 | Berry | Dec. 21, 1937 |
| 2,254,430 | Le Suer et al. | Sept. 2, 1941 |
| 2,404,414 | Sutton | July 23, 1946 |
| 2,635,753 | McLean | Apr. 21, 1953 |

FOREIGN PATENTS

| | | |
|---|---|---|
| 320,207 | Great Britain | Oct. 10, 1939 |
| 711,465 | France | Sept. 10, 1931 |